United States Patent

[11] 3,582,561

[72] Inventors Martin Dempsey;
John G. Van Bosse, both of Mount Prospect, Ill.

[21] Appl. No. 798,383
[22] Filed Feb. 11, 1969
[45] Patented June 1, 1971
[73] Assignee Automatic Electric Laboratories, Inc. Northlake, Ill.

[54] PERMALLOY FILM MONITORING DEVICE FOR TELEPHONE LINE CIRCUITS
4 Claims, 8 Drawing Figs.

[52] U.S. Cl. 179/18, 340/174
[51] Int. Cl. H04m 3/22
[50] Field of Search 179/18.6, 18.6 A, 18.3, 18.3 A, 18 BT; 340/174 CT, 174 TF

[56] References Cited

UNITED STATES PATENTS 3,461,247 8/1969 Van Bosse 179/18 (.3A)

*Primary Examiner*—William C. Cooper
*Assistant Examiner*—Thomas W. Brown
*Attorneys*—Spencer E. Olson, K. Mullerheim and B. E. Frantz

ABSTRACT: A device for monitoring current in a circuit includes a sheet of saturable magnetic material with a saturation winding, encircling a portion of the sheet, connected in the circuit being monitored for permitting saturation of the magnetic material. A signal source and a detector circuit are each connected to a separate conductive loop which threads apertures formed in the magnetic structure. Whenever the magnetic material is unsaturated, the signal source and the detector circuit are coupled together, with the magnetic material acting as the coupling medium. However, whenever current flows in the monitored circuit and hence in the saturation winding, the magnetic material becomes saturated and the signal source and detector are effectively decoupled. The signal I and the detector loops are wound orthogonal to the saturation winding to provide isolation between the circuit being monitored and the monitoring circuits.

INVENTORS
MARTIN E. DEMPSEY
JOHN G. VAN BOSSE
BY
AGENT

PERMALLOY FILM MONITORING DEVICE FOR TELEPHONE LINE CIRCUITS

BACKGROUND OF THE INVENTION

1. Field of the Invention

This invention relates to monitoring apparatus and, more particularly, to such apparatus employing magnetic sensing devices for the supervision of telephone lines and trunks.

Apparatus for monitoring the status of telephone lines and trunks are known in the art. For example, in U.S. Pat. No. 3,175,042, assigned to Bell Telephone Laboratories, Inc., and issued on Mar. 23, 1965, there is described apparatus of this type including a sensing device which includes an elongated ferrite stick of square loop material having a pair of apertures through which are threaded two electrically conductive loops. The element is mounted within a bobbin on which is wound a multiturn saturation winding. The coil is connected in series with the telephone line under supervision.

When a current pulse is applied to one of the loops that thread the apertures, a pulse is induced in the other loop if the multiturn coil is not energized. If the saturation winding is energized with sufficient current to saturate the ferromagnetic element, the induced pulse will be of significantly lower magnitude than when the element is not saturated. Thus, the result of a subscriber lifting a handset will be recognized by the absence of a pulse on the output loop when the input loop is driven by the current pulse.

This type of element is not advantageously used in a matrix array to provide supervision for a number of circuits, and in such an array, several thousand elements may be employed. The operation of the device, as shown in U.S. Pat. No. 3,175,042, requires that a large portion of the magnetic flux exist in the air around each element, and caution must be taken to prevent magnetic interaction between elements mounted adjacent one another in the matrix.

Another monitoring device of this type is shown in the application Ser. No. 545,451, filed Apr. 26, 1966, of Frank A. Risky, now Pat. No. 3,466,402. One feature of the device shown in this application is the concentration of flux within a magnetic core to reduce the spacing required between adjacent elements.

However, these earlier devices have a relatively high coercive force and consequently, a large number of turns are required for the saturation winding because the amount of current is fixed by the application and is generally on the order of 10 to 100 milliamps.

To simplify the manufacture of magnetic sensing devices such as those described above which require a large number of turns to be wound on the element, the saturation winding was wound on a bobbin. Thus, for the sensing device of U.S. Pat. No. 3,175,042, the element wound with the required drive and sense windings is inserted into the core of the bobbin. In accordance with application Ser. No. 545,451, the bobbin is contained within the core and the drive and sense windings are wound on specially formed portions of the core structure. However, in both cases, the addition of a bobbin dictated a necessarily larger physical size for the devices and the size of a matrix of such devices increased, accordingly.

SUMMARY OF THE INVENTION

This invention provides a monitoring device that has a smaller physical size—by about two orders of magnitude—than devices previously proposed and, accordingly, permits a larger number of devices to be arranged in a matrix without appreciably increasing the size of the matrix. Furthermore, the device which uses a thin magnetic foil or film, with a closed magnetic path, as the magnetic element requires fewer turns for the saturation winding and the necessity for a separate bobbin is eliminated.

In one embodiment of the invention, a monitoring device comprises a thin film of linear magnetic material deposited on a substrate and having a printed or deposited saturation winding encircling a portion of the film. The device further includes an interrogate loop and a sense loop which thread apertures formed in the film. The saturation winding is connected in the circuit being monitored and the state of the film is changed in accordance with the flow of current in the saturation winding. Below a certain value of current, the film is not saturated. At the threshold value of current, the film approaches saturation and the drive and sense loops are decoupled. The thin film or foil sensing device, provided by this invention, lends itself readily to batch fabrication so that a matrix of sensing elements can be produced quickly and economically.

DESCRIPTION OF THE DRAWINGS

The invention will now be described with reference to the following drawings in which.

DETAILED DESCRIPTION

Figure 1:
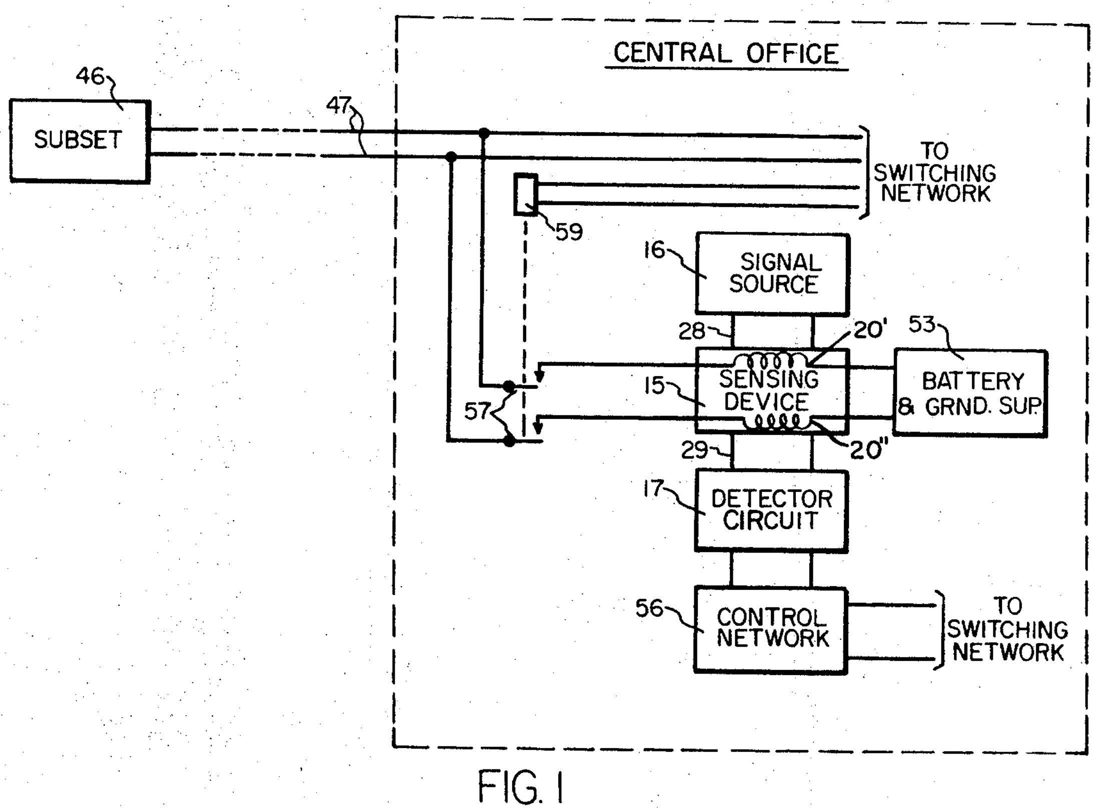
FIG. 1 is a schematic representation of apparatus for monitoring telephone line circuits.

Referring first to FIG. 1 is a schematic representation of a telephone line circuit system showing how the monitoring apparatus of the present invention can be used to monitor the status of a subscriber line. The apparatus includes a sensing device 15, a signal generating source or drive circuit 16, a detector or sending circuit 17 and associated control elements. The sensing device is connected to a subscriber line 47 through normally closed contacts 57 of a relay 59.

Figure 2:
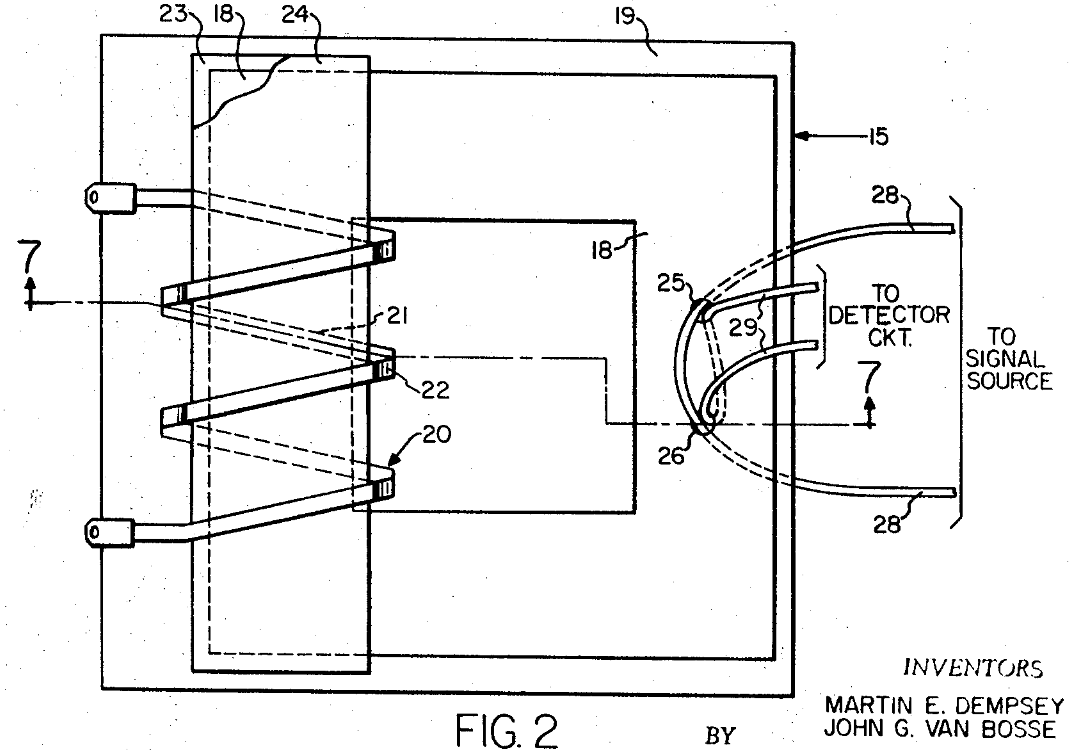
FIG. 2 is a top view of a magnetic permalloy thin film sensing device, for use in the arrangement of FIG. 1, and constructed in accordance with the principles of this invention.

The sensing device, shown in FIG. 2, includes a magnetic structure having a thin film or foil of ferromagnetic material 18 deposited on a suitable substrate 19 and forming a closed magnetic element, rectangular in shape. The preferred material is permalloy but any ferromagnetic material with sufficiently high permeability in the unsaturated state and a low threshold for magnetic saturation would be suitable. The film can be toroidal or some other geometric shape, but is preferably rectangular to simplify the printing of the saturation winding 20 which encircles one leg of the film. The magnetic element is similar to a torus with the magnetic material removed from the center of the rectangle to form what is hereinafter termed a "squared torus." This configuration serves to concentrate the available magnetic flux in a smaller volume of magnetic material. Regardless of the shape of the film, it is preferable that the film have a uniform cross-sectional area.

Figure 7:
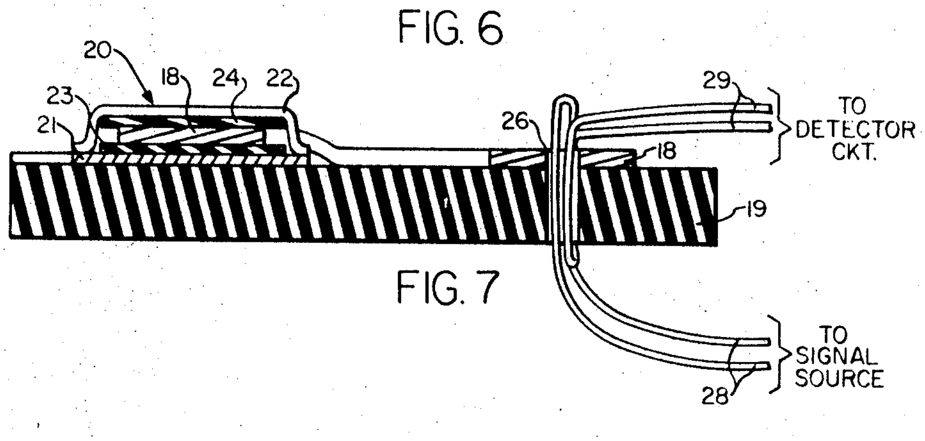

A saturation or control winding 20 has a lower section 21 and an upper section 22, shown in FIG. 7, printed or deposited in strips on the substrate and over one side or leg of the film. The ends of the lower sections extend beyond the film and are exposed to permit the upper section 22 of the winding to connect to the lower sections to form a continuous winding, having a plurality of turns encircling one leg of the permalloy film. The saturating winding, which may be of copper, is insulated from the permalloy magnetic film by layers 23 and 24 of a suitable insulating material shown in FIGS. 2 and 7. The saturating winding 20, shown in FIG. 2 as a unitary winding, may be made in two substantially identical half-sections, designated 20′ and 20″ in FIG. 1, so that when employed in a line circuit system and as shown in FIG. 1, half of the saturating winding may be connected in series with each of the line conductors to provide a balanced impedance characteristic for the line.

Apertures 25 and 26 extend through the film and the substrate and a pair of conductive loops 28 and 29 thread the apertures. The magnetic film structure provides two orthogonal nonremanent flux paths therein. One of the flux paths lies around apertures 25 and 26 in the film and is linked by the conductive loops 28 and 29. The other flux path is substantially perpendicular to the flux path adjacent the apertures, and is linked by the saturating winding 20.

By employing orthogonal flux fields, the magnetic sensing device, according to the invention, exhibits a high signal-to-noise ratio. This characteristic is desired when the device is to be used to monitor a circuit which may exhibit a wide range of current levels. Since the flux fields created by the conductive loops and the saturating winding are orthogonal, there is no electromagnetic or electrostatic coupling between the saturating winding and the loops; that is, there is no conventional or transformer-type magnetic coupling present.

The use of permalloy rather than ferrite as in sensing devices previously proposed permits a reasonably small number of turns for the saturation winding because the coercive force $H_c$ of permalloy is only approximately 0.05 oersted. In general:

$$H_c=1.25\,(NIC/L)$$

where $I_C$ is the current flowing in the saturating winding, in amperes, and $L$ is the length of the magnetic path, in centimeters. For example, when $I_C=5$ milliamps for saturation, and $H_C=0.05$ oersted, then $N=8L$. Thus, when $L=4$ centimeters, $N=32$ turns.

While the length of the legs which make up the "squared torus" may range from three to eight times the width of the legs, it has been found that for a monitoring device using a square magnetic film of permalloy material, a ratio of four to one yields optimum operating characteristics. It should be noted, however, that the foregoing figures pertain to the particular embodiment constructed and that a greater range and a different optimum value for the length-to-width ratio may be applicable to other embodiments. The unsaturated output voltage, for a fixed shape of the interrogate current pulse, or signal, is proportional to the area of the permalloy film linking the interrogate and sense windings. This area is in turn, proportional to the distance between the apertures 25, 26 and thickness of the permalloy film. For high output voltage, a thick film or piece of permalloy foil would be desirable. On the other hand, the use of a thick film may result in low switching speeds because of eddy currents. Thus, a compromise must be made between the magnitude of the output voltage and the switching speed and the structure or thickness of the sheet of magnetic material will depend on the application of the device.

Briefly, referring to FIGS. 3—7, the device according to the preferred embodiment shown in FIG. 2, is fabricated using procedures known in the art with the individual layers which overlay one another to form the magnetic structure being deposited by vacuum deposition techniques such as evaporation, or sputtering and etching processes. Although vacuum deposition techniques have been assumed for the purpose of the embodiment described, it should be noted that other deposition techniques such as by chemical vapor deposition or in part, at least, by electroplating, could also be used.

Figure 3:
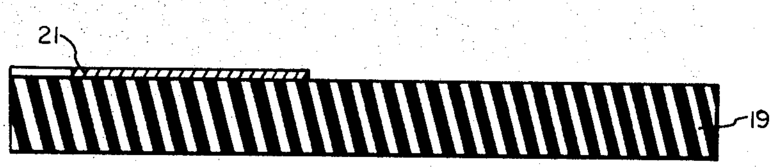
FIGS. 3—7 show the permalloy film sensing device of FIG. 2 at various stages of the manufacturing process.

Referring first to FIG. 3, the lower portion 21 of a control winding is deposited on a suitable substrate 19 which may be, for instance, a mylar film.

Figure 4:
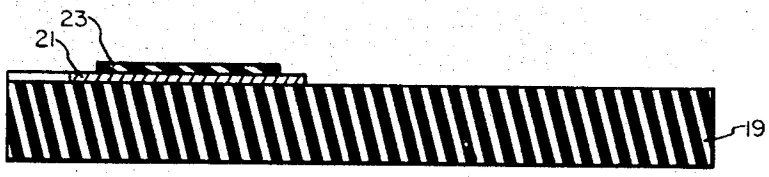

A layer of insulating material 23, shown in FIG. 4, is deposited over a portion of the lower part 21 of the saturation winding in order to provide electrical isolation between the permalloy film to be deposited and the conductor 21.

Figure 5:
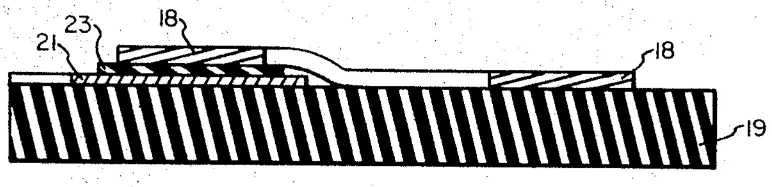

A film of magnetic permalloy material 18 is deposited on the substrate 19 and over the insulated portion of the saturation winding 21 as shown in FIG. 5. Because of the size of the completed device, the dimensions of some of the deposited layers have been misproportioned in the drawing in order to more clearly show the structure of the sensing device. However, the individual magnetic, insulative or conductive, films which form the separate layers of the device are actually of a substantially constant thickness, and this thickness is determined in accordance with the particular application and the materials used for the films.

Figure 6:
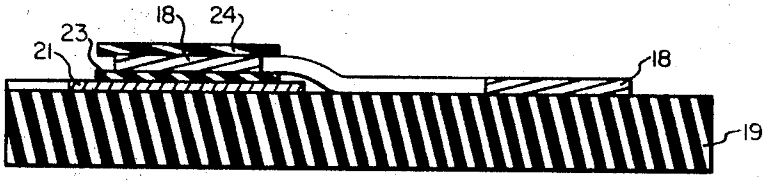

A second layer 24 of insulating material is then deposited over the portion of the permalloy film which covers the lower portion 21 of the saturation winding as shown in FIG. 6.

Finally, as shown in FIG. 7, the upper portion 22 of the saturation winding is deposited on the substrate over the portion of the permalloy film to join the ends of adjacent ones of the lower portions 21 of the saturation windings to form a complete winding which encircles one of the legs of the permalloy film but is insulated therefrom.

After the device has been completely deposited on the substrate, apertures 25 and 26 are provided in the film and in the substrate, and conductive loops 28, 29 are threaded through the apertures.

The use of the deposition process for providing both the magnetic films and the saturation windings on the substrate simplifies the production. Whereas in the past, the saturation windings were wound on a bobbin and the magnetic element was, for example, slipped into the core of the bobbin, or, on the other hand, when the bobbin was positioned within the magnetic structure, a necessarily large element resulted and the effects of magnetic interactions between adjacent devices were increased.

In contrast, the magnetic sending devices, as provided by the present invention, are easily fabricated, simultaneously, with the saturation winding being produced along with the magnetic film. Moreover, in view of the smaller physical size of the device, the closed magnetic structure, and the placement of the saturation windings relative to the magnetic film, separated therefrom by only a layer of insulation, the effects of magnetic interaction between adjacent devices are minimized and the spacing between adjacent devices can be reduced.

Figure 8:
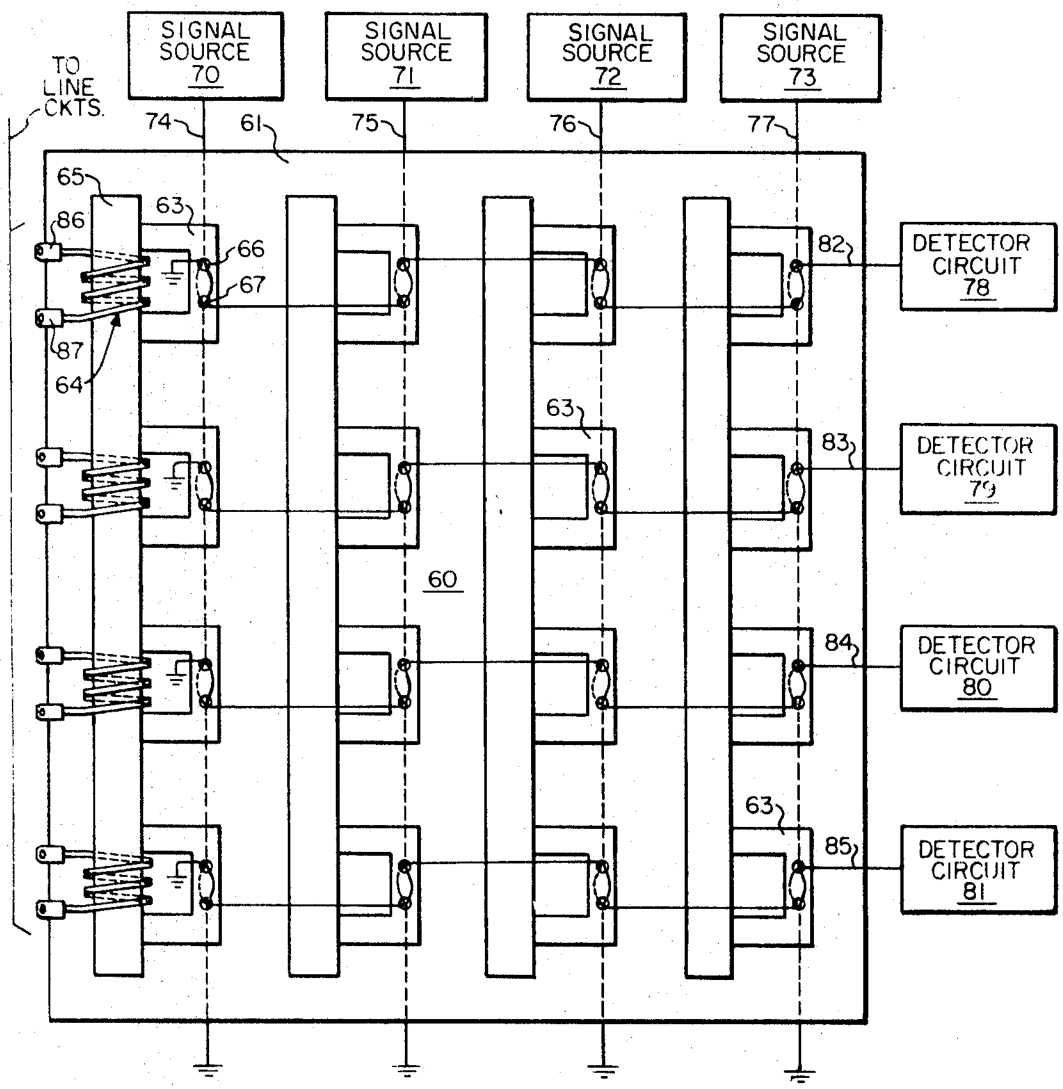
FIG. 8 shows a matrix of sensing devices produced on a common substrate by a batch processing technique.

Another advantage of the deposited thin film sensing device is that it lends itself readily to fabrication using batch processing techniques whereby a plurality of individual sensing devices are deposited on a common substrate. By way of example, FIG. 8 shows a matrix 60 of 16 sensing devices deposited on a common substrate 61 using a batch processing technique. The devices, which are arranged on the substrate in a 4×4 matrix to permit accessing on a coordinate basis, are deposited on the substrate in accordance with the techniques outlines above with reference to FIG. 3—7 for an individual device.

Each device includes a magnetic film 63 of linear permalloy material and a saturation winding 64 deposited on the substrate and encircling one leg of the film 63. As described above with reference to FIGS. 3—7, each saturation winding includes two portions, one deposited directly on the substrate and underlying a portion of the film and the other portion deposited to overlay a portion of the film. The saturation winding is insulated from the top and bottom surfaces of the magnetic film by two layers of insulation. One of these layers 65 is shown in FIG. 8. Apertures 66, 67 are provided in the leg of the film opposite the leg encircled by the saturation winding 64.

In the batch processing technique, the individual layers for the 16 devices are deposited simultaneously on the substrate using masking techniques known in the art to delineate the films peculiar to a single device. Thus, the 16 magnetic films are deposited simultaneously. Each part of the 16, two-part, saturation windings are deposited simultaneously, and the layers of insulating material associated with each device are deposited simultaneously.

After the composite layers of the devices have been deposited on the common substrate 61, the apertures 66, 67 are provided in a leg of each magnetic film.

Accessing of the 16 devices 62 in the matrix 60 is accomplished on a coordinate basis by sending a current pulse from one of the drive circuits 70—73 through the devices in a column of the matrix via drive windings 74—77 which serially thread the apertures 66, 67, of all the devices in the column. A current pulse from signal source 70 is coupled via the thin films to one of four detector circuits 78—81 which are coupled to the films by input leads 82—85 which thread the apertures 66, 67 of the devices in the four rows of the matrix.

The saturation windings 64 for the 16 sensing elements, are individually connected in series with a line circuit to be monitored. The ends of the saturation windings are terminated in tabs 86, 87 suitable to permit connection between the line circuits and the saturation windings.

The state of each sensing device, that is, magnetic film saturated or unsaturated, is related to the current flow in the line circuit being monitored. When there is no current flow, each drive circuit, such as 70 is coupled via conductor loop 74 and the magnetic film 63 to all four sense circuits 78—81. However, if the magnetic films of any of the devices in the first column are saturated, the signal from source 70 would not be coupled to the detector circuit connected to the saturated element. The presence or the absence of signals by the detector circuits 78—81 is indicative of the status of the four line circuits connected to the saturation windings of the devices in the first column of the matrix. By selecting one signal source, such as source 70, and one detector circuit, such as circuit 78, the status of a particular line circuit, in this case a line connected to the saturation winding of the sensing device in the first column and first row of the matrix, can be determined.

In view of the large number of line circuits which must be monitored in a telephone line circuit system, these devices would be arranged in a matrix or a number of matrices which may include as many as 32 rows and 32 columns, and it should be understood that the applications shown in FIGS. 1 and 8 are merely illustrative and are not meant as limitations on the invention. Similarly, it should be apparent that if a matrix of over a 1,000 elements were used, all of the elements could be produced simultaneously in accordance with the batch processing techniques described above.

Referring again to FIG. 1, the monitoring device as shown is used to monitor the flow of direct current in a subscriber line circuit 47 of a telephone switching system. The device could also be used in other telephone circuits such as trunk or junctor circuits or in other systems which require monitoring a direct current. The monitoring function is accomplished by using the effect of magnetic saturation to decouple the output of the signal generating source 16 and the input of the detector circuit 17. As previously mentioned, in FIG. 1 it has been assumed that two half-sections of the saturating winding, designated 20 and 20″, are serially connected in the line circuit 47 via contacts 57 of relay 59. The signal source and the detector circuit are connected to the conductive loops 28 and 29, respectively, which thread the apertures 25 and 26 in the film. The signal generator 16 is preferably a source of current pluses of alternating polarity; however, inasmuch as there is no remanent switching, a source that provides unipolar current pulses may be used. The detector circuit 17 is of a type known in the art for detecting voltage pulses.

The magnetic material in the vicinity of the apertures acts as a coupling medium, so that, whenever the magnetic structure is unsaturated, a signal from the signal source 16 is inductively coupled to the loop connected to the detector circuit 17.

The response characteristic of the sensing element 15 is such that whenever a subscriber lifts a handset, the current available in the line circuit 47 is sufficient to saturate the magnetic film 18 encompassed by the saturation winding. The saturation of the element will effectively decouple loops 28 and 29 and consequently, the signal source and the detector circuit.

Loop 29 is monitored so that the presence or absence of an output on this winding is indicative of the status of the subscriber line. An indication from the detector circuit 17 via a common control network 56 to the switching network that the subscriber requires service will cause dial tone to be supplied over the line conductors 47, and will cause relay 59 to be operated to disconnect the saturation winding of the sensing device from the line.

From the foregoing, it is apparent that the sensing device provided by this invention lends itself readily to miniaturization because of the size of the sheet of film or magnetic material used and because of the low number of ampere turns required to saturate the magnetic member. Moreover, when a plurality of such devices are employed in a matrix arrangement or otherwise mounted adjacent one another the smaller size of the device—approximately 100th of that of conventional sensing devices—as well as the requirement of fewer turns for the saturation winding make the device less susceptible to the effects of magnetic interaction between adjacent elements. More specifically, and using the dimensions of the models tested, four "scanpoints" according to the invention were accommodated on a 1″×1″×10/64″ substrate. This corresponds to a volume of 10/64/4 or 0.04 in.$^3$ per scanpoint. Scanpoints of conventional design are roughly two orders of magnitude larger.

What I claim is:

1. In a telephone line circuit system, a signal source, a detector circuit, a monitoring device associated with each line circuit of said system for coupling said signal source to said detector circuit during an on-hook condition and for decoupling said signal source from said detector circuit during an off-hook condition in response to the flow of current in said line circuit; said monitoring device comprising;
   - a substrate of insulating material,
   - a sheet of linear magnetic material deposited on said substrate and having a center opening rendering said sheet generally toroidal in shape and also having a pair of apertures displaced with respect to said center opening,
   - first and second conductive loops threading said apertures and sharing a first nonremanent flux path in said sheet,
   - a third conductive loop extending through said center opening and formed by deposition so as to encircle a portion of said sheet, said third loop, when energized, giving rise to a second nonremanent flux path in said sheet, which is substantially perpendicular to said first flux path,
   - said first loop being connected to said signal source for inducing a signal in said second loop whenever said sheet is unsaturated, said second loop being connected to said detector circuit for detecting said induced signal, and said third loop being connected in said line circuit and said sheet being saturated wherever said line current is flowing.

2. A monitoring device in a telephone line circuit system as claimed in claim 1, wherein said sheet of magnetic material comprises a thin film of permalloy in the shape of a squared torus with the length of each side being approximately four times the width of each side and wherein said third conductive loop comprises a multiturn winding encircling one side of said squared torus.

3. A monitoring device in a telephone line circuit system as claimed in claim 1, wherein said third loop comprises first and second portions of conductive film, said first portion being disposed on one side of said substrate and underlying a part of said sheet of magnetic material in insulated relationship therewith and said second portion being disposed on said same side of said substrate and overlying said part of said magnetic material in insulated relationship therewith.

4. A monitoring device in a telephone line circuit system as claimed in claim 3, wherein both said first and second conductive loops extend through said sheet of magnetic material as well as said substrate.